US006096427A

United States Patent [19]

Chen et al.

[11] Patent Number: 6,096,427

[45] Date of Patent: Aug. 1, 2000

[54] FUSER BELTS WITH ADHESION PROMOTING LAYER

[75] Inventors: Jiann H. Chen, Fairport; Charles C. Anderson, Penfield, both of N.Y.; Andy Tsou, Houston, Tex.

[73] Assignee: Eastman Kodak Company, Rochester, N.Y.

[21] Appl. No.: 09/123,037

[22] Filed: Jul. 27, 1998

[51] Int. Cl.[7] .......................... B32B 15/08; B32B 27/34; B32B 27/36; B32B 27/40; G03G 15/20

[52] U.S. Cl. .......................... 428/412; 399/329; 399/333; 428/423.5; 428/423.7; 428/425.5; 428/425.8; 428/473.5; 430/102

[58] Field of Search .................................... 399/329, 333; 430/102; 428/425.5, 412, 423.5, 423.7, 425.8, 473.5

[56] References Cited

U.S. PATENT DOCUMENTS

| | | | |
|---|---|---|---|
| 5,089,363 | 2/1992 | Rimai et al. | 430/45 |
| 5,124,755 | 6/1992 | Hediger | 399/329 |
| 5,200,284 | 4/1993 | Chen et al. | 430/33 |
| 5,233,008 | 8/1993 | Chen et al. | 528/33 |
| 5,258,256 | 11/1993 | Aslam et al. | 430/124 |
| 5,330,840 | 7/1994 | Chen et al. | 428/423.1 |
| 5,362,833 | 11/1994 | Chen et al. | 528/25 |
| 5,386,281 | 1/1995 | Mitani et al. | 399/329 |
| 5,465,146 | 11/1995 | Higashi et al. | 399/328 |
| 5,529,847 | 6/1996 | Chen et al. | 428/413 |
| 5,708,948 | 1/1998 | Chen et al. | 399/329 |
| 5,778,295 | 7/1998 | Chen et al. | 399/329 |
| 5,910,370 | 6/1999 | Katsura et al. | 428/425.5 |

OTHER PUBLICATIONS

Kirk–Othmer, Encyclopedia of Chemical Technology, 4th Ed. vol. 22, John Wiley & Sons, New York, 1997, pp. 113–116.

Mark et al, Encyclopedia of Polymer Science and Engineering, vol. 15, John Wiley & Sons, New York, 1989, pp. 265–270.

*Primary Examiner*—D. S. Nakarani

*Attorney, Agent, or Firm*—Raymond L. Owens

[57] ABSTRACT

A toner fuser belt for use with electrophotographic apparatus including a thermally conductive substrate through which heat is applied; a toner release layer formed over the substrate; and an adhesion promoting layer including an aliphatic cross-linked polyurethane which is stable at fusing temperatures provided between the substrate and the toner release layer and wherein the aliphatic cross-linked polyurethane is selected to provide good adhesion between the substrate and the toner release layer.

3 Claims, 2 Drawing Sheets

FUSER BELTS WITH ADHESION PROMOTING LAYER

CROSS REFERENCE TO RELATED APPLICATION

Reference is made to commonly assigned U.S. patent application Ser. No. 09/123,007, filed Jul. 28, 1998, now U.S. Pat. No. 5,956,555, issued Sep. 21, 1999, entitled "Fusing Belt Having Polyurethane Release Layer" by Chen et al, the teachings of which are incorporated herein by reference.

FIELD OF THE INVENTION

This invention relates to fusing belt useful in electrophotographic apparatus for heat-fusing a heat-softenable toner material to a receiver.

BACKGROUND OF THE INVENTION

Electrophotography can be used to create photographic quality multicolor toner images when the toner particles are small, that is, less than about 10 micrometers, and the receivers, typically papers, are smooth. Electrophotography typically involves the steps of charging a photoconductive element, exposing the photoconductive or dielectric element to create an electrostatic image, toning the electrostatic image, transferring the toner to a receiver, and fixing the toner to the receiver. A typical method of making a multicolor toner image involves trichromatic color synthesis by subtractive color formation. In such synthesis successive imagewise electrostatic images are formed on an element, each representing a different color, and each image is developed with a toner of a different color. Typically, the colors will correspond to each of the three primary colors (cyan, magenta and yellow) and black, if desired. The imagewise electrostatic images for each of the colors can be made successively on a photoconductive element by using filters for each color separation to reflect only the light corresponding to each color in the image to the photoconductive element. After developing each color separation, it can be transferred from the photoconductive element successively in registration with the other color toner images to an intermediate transfer member and then all the color toner images can be transferred in one step from the intermediate transfer member to a receiver. After all the color toners have been transferred to the receiver, the toners are fixed or fused to the receiver. To match the photographic quality produced using silver halide technology, it is preferred that these multicolor toner images have high gloss.

Commonly-assigned U.S. Pat. No. 5,258,256 discloses that toners having specified viscoelastic flow characteristics, as evidenced by a loss tangent of at least 1.2, used in a belt fusing system can provide desirable gloss. The belt in the belt fusing system, can be made of stainless steel or polyester. When polyester is used the belt can be formed solely of that material or it can be coated with a toner release layer. The outer surface of the fuser member can be aluminum, steel, various alloys, or polymeric materials, such as, thermoset resins and fluoroelastomers. Further, release agents may be used on the fuser belt. Commonly-assigned U.S. Pat. No. 5,708,948 shows an effective toner release layer coated on a substrate. This toner release layer has been found to be quite effective but there remain problems of its adhesion to the substrate.

The background art discloses several broad classes of materials useful for fuser belts. For example, commonly assigned U.S. Pat. Nos. 5,089,363; 5,362,833; 5,529,847; 5,330,840; 5,233,008; 5,200,284, and U.S. Pat. Nos. 5,465,146; 5,386,281; and 5,124,755 disclose fuser belts coated with toner release layers formed of silicone polymers. Commonly-assigned U.S. Pat. Nos. 5,089,363 and 5,708,948 disclose that fuser belts coated with a toner release layer formed of highly crosslinked polysiloxanes provide fused toner images having high gloss. Commonly-assigned U.S. Pat. No. 5,778,295, describes fuser belts containing a crosslinked, silicone resin intermediate layer and a toner release layer that comprises a silsesquioxane polymer.

While fuser belts described in the aforementioned prior art provide high gloss and good release of the fused toner images there is a need to improve the adhesion of the toner release layer to the substrate to promote belt life.

SUMMARY OF THE INVENTION

It is an object of the present invention to provide a fuser belt containing an adhesion promoting layer for adhering the toner release layer to the substrate.

A further object of the present invention is to provide a fuser belt that has improved wear resistance and excellent release properties. Another object of the present invention is to provide a fuser belt that provides fused toner images having high gloss.

These objects are achieved in a toner fuser belt for use with electrophotographic apparatus comprising:

(a) a thermally conductive substrate through which heat is applied;

(b) a toner release layer formed over the substrate; and (c) an adhesion promoting layer including an aliphatic cross-linked polyurethane which is stable at fusing temperatures provided between the substrate and the toner release layer and wherein the aliphatic cross-linked polyurethane is selected to provide good adhesion between the substrate and the toner release layer.

It is an advantage of the present invention to provide a fuser belt that has high gloss, long-life, and good release of the fused toner images. The life of the fuser belts is typically greater than 5,000 fused toner images.

DESCRIPTION OF THE PREFERRED EMBODIMENTS

Fuser belts of this invention can be any size and can be used in any fuser belt system which comprises a fuser belt. Preferably the fuser belt system comprises a fuser belt which is trained around two or more rollers, and is in pressurized contact with another fuser member, preferably either another fuser belt or a fuser roller. Fuser belts of this invention can be used to contact the toner-bearing or non-toner-bearing side of a receiver.

Figure 1:
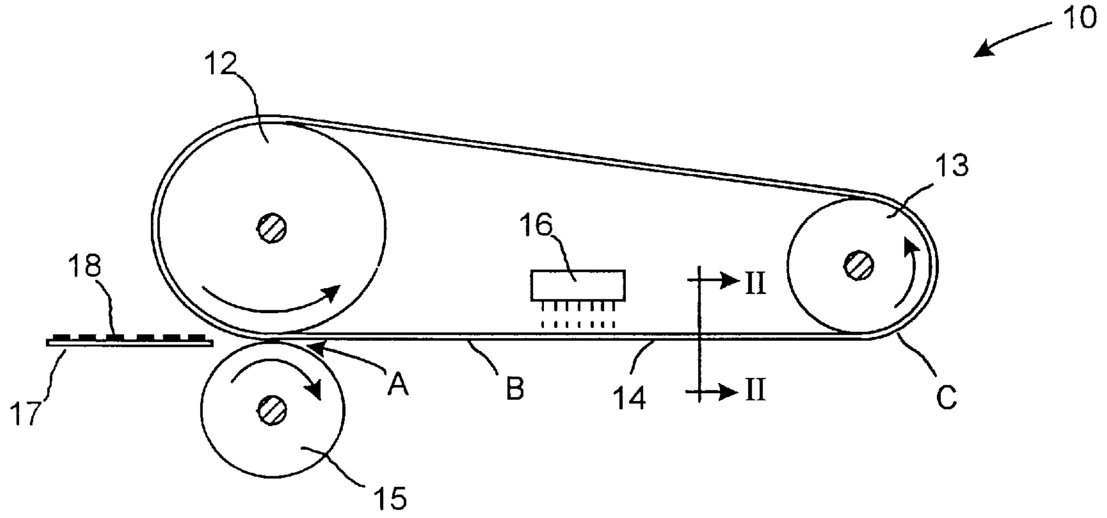
FIG. 1 shows a fuser belt system which is effective for fusing or fixing toner to a receiver surface.

FIG. 1 illustrates a typical configuration of a fuser belt system 10 using a fuser belt 14 in the form of a web. As will be subsequently described, the fuser belt 14 has an improved adhesion promoting layer. The fuser belt system 10 includes a heating roller 12 which also drives the web in conjunction with a roller 13 along an endless path. More particularly, the fuser belt 14 is trained about both the heating roller 12 and roller 13. A backup pressure roller 15 is biased against the heating roller 12.The fuser belt 14 is cooled by impinging air provided by blower 16 disposed above fuser belt 14. In operation, a receiver 17 bearing the unfused toner 18 is transported in the direction of the arrow into the nip between heating roller 12 and backup pressure roller 15, which can also or alternatively be heated if desired, where it enters a fusing zone A extending about 0.25 to 2.5 cm, preferably about 0.6 cm laterally along the fuser belt 14. Following fusing in the fusing zone A, the fused image then continues along the path of the fuser belt 14 and into the cooling zone B about 5 to 50 cm in length in the region after the fusing zone A and to roller 13. In the cooling zone B, fuser belt 14 is cooled slightly upon separation from heating roller 12 and then additionally cooled in a controlled manner by air that is caused to impinge upon fuser belt 14 as the fuser belt 14 passes around roller 13 and is transported to copy collection means such as a tray (not shown). Receiver 17 bearing the fused image is separated from the fuser belt 14 within the release zone C at a temperature where no toner image offset occurs. Separation by selecting roller 13 to have a relatively small diameter, e.g. a diameter of about 2.5 to 4 cm. As a result of passing through the three distinct zones, i.e. the fusing zone A, cooling zone B and release zone C, the fused toner image exhibits high gloss. The extent of each of the three zones and the duration of the time the toner image resides in each zone can be conveniently controlled simply by adjusting the velocity or speed of fuser belt 14. The velocity of the fuser belt 14 in a specific situation will depend on several variables, including, for example, the temperature of the fuser belt 14 in the fusing zone A, the temperature of the cooling air in the cooling zone B, and the composition of the toner particles.

Figure 2:
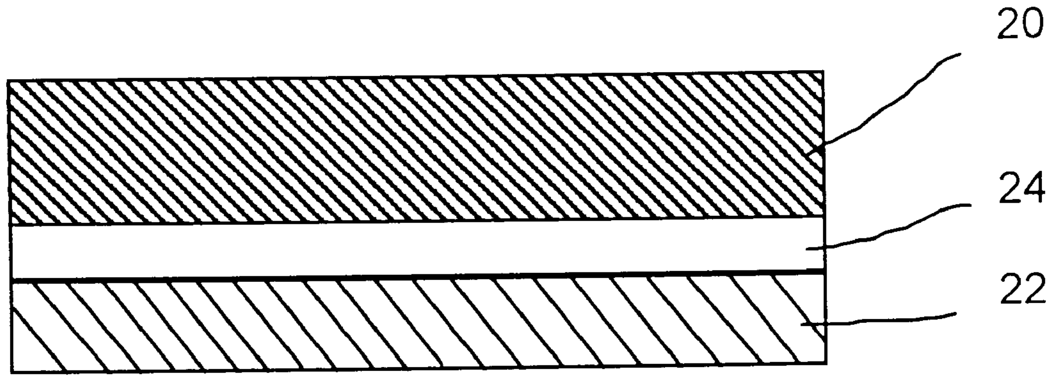
FIG. 2 is a cross-sectional view taken along lines II—II of the fuser belt of FIG. 1 and illustrating the present invention.

Turning now to FIG. 2, a cross-sectional view of the fuser belt 14 according to the present invention includes a thermally conductive substrate 20 through which heat is applied. The substrate 20 can include metal, such as, stainless steel, steel, nickel, copper, and chrome, or a polymer, such as, polyimide, polyester, polycarbonate, and polyamide, polyamide-imide or mixtures or combinations thereof. The substrate 20 can be a smooth sheet or a meshed material, preferably it is a smooth sheet. The substrate 20 is preferably a seamless endless belt; however, belts having seams can also be used. The thickness of the substrate 20 is preferably 50 to 200 micrometers, more preferably 50 to 100 micrometers and most preferably 50 to 75 micrometers. Other materials which are also conductive will suggest themselves to those skilled in the art.

A toner release layer 22 is formed over the substrate 20. The toner release layer 22 will be described in more detail later. In accordance with the present invention, an adhesion promoting layer 24 including an aliphatic polyurethane material which is stable at fusing temperatures is provided between the substrate 20 and the toner release layer 22 and wherein the aliphatic polyurethane material is selected to provide good adhesion between the substrate 20 and the toner release layer 22. The toner release layer 22 can include a crosslinked silicone resin coating applied over the adhesion promoting layer 24.

Polyurethanes are selected for the adhesion promoting layer 24 because of their availability, excellent coating and film forming properties, and excellent adhesion to a wide variety of substrates. Advantageously, the polyurethane is a water dispersible aliphatic polyurethane. Aliphatic polyurethanes are preferred for their thermal stability at fusing temperatures around 250° F. Water dispersible polyurethanes are well known and are prepared by chain extending a prepolymer containing terminal isocyanate groups with an active hydrogen compound, usually a diamine or diol. The prepolymer is formed by reacting a diol or polyol having terminal hydroxyl groups with excess diisocyanate or polyisocyanate. The diisocyanate or polyisocyanate is an aliphatic diisocyanate or polyisocyanate. For a more complete discussion of aliphatic diisocyanate and polyisocyanate see Zeno W. Wicks et al, Organic Coatings: Science and Technology, Vol. 1, Film Formation, Components and Appearance, A Wiley Interscience Publication, John Wiley & Sons, New York, 1992, pp. 198–200. Polyurethanes which are useful in the present invention must be cross-linked.

To permit dispersion in water, the prepolymer is functionalized with hydrophilic groups. Anionic, cationic, or nonionically stabilized prepolymers can be prepared. Anionic dispersions contain usually either carboxylate or sulphonate functionalized co-monomers, e.g., suitably hindered dihydroxy carboxylic acids (dimethylol propionic acid) or dihydroxy sulphonic acids. Cationic systems are prepared by the incorporation of diols containing tertiary nitrogen atoms, which are converted to the quaternary ammonium ion by the addition of a suitable alkylating agent or acid. Nonionically stabilized prepolymers can be prepared by the use of diol or diisocyanate co-monomers bearing pendant polyethylene oxide chains. These result in polyurethanes with stability over a wide range of pH. Nonionic and anionic groups may be combined synergistically to yield "universal" urethane dispersions. Of the above, anionic polyurethanes are by far the most significant.

One of several different techniques may be used to prepare polyurethane dispersions. For example, the prepolymer may be formed, neutralized or alkylated if appropriate, then chain extended in an excess of organic solvent such as acetone or tetrahydrofuran. The prepolymer solution is then diluted with water and the solvent removed by distillation. This is known as the "acetone" process. Alternatively, a low molecular weight prepolymer can be prepared, usually in the presence of a small amount of solvent to reduce viscosity, and chain extended with diamine just after the prepolymer is dispersed into water. The latter is termed the "prepolymer mixing" process and for economic reasons is much preferred over the former.

Polyols useful for the preparation of polyurethane dispersions include polyester polyols prepared from a diol (e.g. ethylene glycol, butylene glycol, neopentyl glycol, hexane diol or mixtures of any of the above) and a dicarboxylic acid or an anhydride (succinic acid, adipic acid, suberic acid, azelaic acid, sebacic acid, phthalic acid, isophthalic acid, maleic acid and anhydrides of these acids), polylactones from lactones such as caprolactone reacted with a diol, polyethers such as polypropylene glycols, and hydroxyl terminated polyacrylics prepared by addition polymerization of acrylic esters such as the aforementioned alkyl acrylate or methacrylates with ethylenically unsaturated monomers containing functional groups such as carboxyl, hydroxyl, cyano groups and/or glycidyl groups.

The principal aliphatic isocyanates that can be used in making aliphatic polyurethanes are 1,6-hexamethylene diisocyanate (HDI), isophorone diisocyanate (IPDI), bis(4-iso-cyanatocyclohexyl)methane (H12,MDI), tetramethyl-m-xylidene diisocyanate (TMXDI), and isopropenyldimethylbenzylisocyanate (TMI). Compounds that are reactive with the isocyanate groups and have a group capable of forming an anion are as follows: dihydroxypropionic acid, dimethylolpropionic acid, dihydroxysuccinic acid and dihydroxybenzoic acid. Other suitable compounds are the polyhydroxy acids which can be prepared by oxidizing monosaccharides, for example gluconic acid, saccharic acid, mucic acid, glucuronic acid and the like.

Suitable tertiary amines which are used to neutralize the acid and form an anionic group for water dispersibility are trimethylamine, triethylamine, dimethylaniline, diethylaniline, triphenylamine and the like. Diamines suitable for chain extension of the polyurethane include ethylenediamine, diaminopropane, hexamethylene diamine, hydrazine, amnioethylethanolamine and the like. Solvents which may be employed to aid in formation of the prepolymer and to lower its viscosity and enhance water dispersibility include methylethylketone, toluene, tetrahydofuran, acetone, dimethylformamide, N-methylpyrrolidone, and the like. Water-miscible solvents like N-methylpyrrolidone are much preferred.

The thickness of the adhesion promoting layers 24 of the invention are about 0.05 $\mu$m to 5 $\mu$m, preferably about 0.1 $\mu$m to 2 $\mu$m.

In addition to the aliphatic polyurethane, the adhesion promoting layer 24 in accordance with the invention may also contain suitable crosslinking agents including aldehydes, epoxy compounds, polyfunctional aziridines, vinyl sulfones, methoxyalkyl melamines, triazines, polyisocyanates, dioxane derivatives such as dihydroxydioxane, carbodiimides, and the like. The crosslinking agents react with the functional groups present on the polyurethane. The adhesion promoting layer 24 may also include surfactants, coating aids, coalescing aids, thermal stabilizers, and filler such as alumina, silica, and others in order to increase the thermal conductivity of the layer.

The toner release layers 22 that are applied onto adhesion promoting layers 24 are described in commonly-assigned U.S. Pat. No. 5,708,948, which is incorporated herein by reference. The toner release-layers 22 include silicone resins that have monofunctional, difunctional, trifunctional and tetrafunctional units or units having mixtures thereof. Mononfunctional units can be represented by the formula $—(R)_3SiO_{0.5}—$. Difunctional units can be represented by the formula $—(R)_2SiO—$. Trifunctional units can be represented by the formula $—(R)SiO_{1.5}—$. Tetrafunctional units can be represented by the formula $—SiO_2—$. R in the formulas independently represents alkyl groups preferably having from 1 to 8 carbons, more preferably 1 to 5 carbons or aryl groups preferably having 4 to 10 carbons in the ring(s), more preferably 6 carbons in the ring(s). The siloxanes used to form the silicone resin comprise at least some R groups which are alkyl groups, and some R groups which are aryl groups. Mixtures of different alkyl groups and different aryl groups may be present in the siloxanes. The alkyl and aryl groups can comprise additional substituents and heteroatoms, such as, halogens, in for example a fluoropropyl group, and alkyl groups, in for example a methylphenyl group. The alkyl groups are preferably methyl, ethyl, propyl, isopropyl, butyl, isobutyl, tert-butyl, pentyl, more preferably methyl, ethyl, propyl, and isopropyl, most preferably methyl. The aryl groups are preferably phenyl, diphenyl, or benzyl, more preferably phenyl. The silicone resins have an alkyl to aryl ratio of 1:0.1 to 1:1.2; more preferably 1:0.3 to 1:1.0; most preferably 1:0.4 to 1:0.9. The silicone resin has a ratio of difunctional to trifunctional units of 1:1 to 1:2.7, more preferably 1:1.5 to 1:2.5, most preferably 1:1.8 to 1:2.3 and at least 90% of total number of functional units in the silicone resin are difunctional and trifunctional units, more preferably at least 95% of total number of functional units in the silicone resin are difunctional and trifunctional units, most preferably at least 98% of total number of functional units in the silicone resin are difunctional and trifunctional units. The preferred silicone resins can include substantially difunctional, trifunctional and tetrafunctional units, meaning that the preferred silicone resins comprise less than 1% monofunctional units of the total number of functional units in the silicone resin. The most preferred silicone resins include substantially difunctional and trifunctional units, meaning that the most preferred silicone resins comprise less than 1% monofunctional and tetrafunctional units of total number of functional units in the silicone resin. The percentages of the functionalities in the silicone resin can be determined using $Si^{29}$ NMR.

The silicone resin is made by curing a composition including siloxanes. Siloxanes can be monofunctional, difunctional, trifunctional and/or tetrafunctional silicone polymers. The siloxanes are preferably hydroxy-terminated silicone polymers or have at least two hydroxy groups per siloxane. The weight average molecular weight of the siloxanes used to make the thermoset silicone resin is preferably 5,000 to 50,000 grams/mole (g/mol), more preferably 6,000 to 30,000 g/mol, most preferably 7,500 to 15,000 g/mol. Even more preferred are siloxanes having a weight average molecular weight of 7,500 to 10,000 g/mol, and more preferably 7,500 to 8,500. The weight average molecular weight is determined by Size Exclusion Chromatography (SEC). Once the silicone resin is cured, typically by thermosetting, it is difficult to determine the weight average molecular weight of the siloxanes used to form the silicone resin; however, the functional units and alkyl to aryl ratio of the siloxanes will be the same for the silicone resin and the siloxanes used to make the silicone resin.

The silicone resin which is preferably highly crosslinked can be prepared as described in numerous publications. The silicone resins used in this invention are hard, brittle, and highly crosslinked, as compared to silicone elastomers which are deformable, elastic, and highly crosslinked. One method to form the silicone resin is by a condensation reaction as described in, for example, Kirk-Othmer, A. Wiley-Interscience Publications, "Encyclopedia of Chemical Technology", $4^{th}$ Ed., 1997, Vol. 22, pp. 113–116 and Herman F. Mark, A. Wiley-Interscience Publication, "Encyclopedia of Polymer Science and Engineering", Vol. 15, $2^{nd}$. Ed., 1989, pp-265–270. Useful silicone resins are commercially available, such as, DM 30036 and DM 30020 available from Acheson Colloids Company, and DC-2531 available from Dow Corning.

The toner release layer 22 can include fillers. It is preferred that the fillers, if present are at an amount less than 3%, more preferably less than 1%, to maintain a smooth surface of the toner release layer 22. Examples of useful fillers include aluminum, silica, and copper. The preferred fuser belts 14 of this invention have toner release layers 22 which do not contain fillers, that is, they are non-filled layers. The non-filled toner release layers 22 are preferred, because typically they produce fused toner images having higher gloss.

The thickness of the toner release layer 22 is preferably less than 50 micrometers, preferably 1 to 25 micrometers, most preferably 1 to 15 micrometers. Additional layers can be present on the fuser belt 14 if desired.

It is preferred that the surface energy of the toner release layer 22 is 20 to 30 milliJoules/meter$^2$ or less, because low surface energy belts provide better release of toner without the addition of release oils. The fuser belt 14 preferably provides a surface finish of the fused toner image of G-20 gloss greater than 70, preferably greater than 80, most preferably greater than 90. The highest gloss is achieved when smooth receivers, such as photographic papers, are used in conjunction with the fuser belts of this invention. The gloss measurements can be determined using a BYK Gardner micro glossmeter set at 20 degrees by the method described in ASTM-523-67.

The substrate 20 of the fuser belt 14 is preferably solvent cleaned prior to coating the adhesion promoting layer 24. There are a number of ways to coat polyurethane adhesion promoting layers. They include coating from organic solvent or aqueous media using conventional coating techniques such as ring coating, dip coating and spray coating. After coating the adhesion promoting layer 24 should be dried typically by air drying, although it can be briefly put into a heated enclosure. After drying, the adhesion promoting layer 24 is cured by high temperature heating (typically 100–2000° C. for 10 min-3 hours).

Aliphatic polyurethanes selected for use in the adhesion promoting layer 24 must be thermally stable at fusing temperatures employed in the electrophotographic apparatus. Typically these fusing temperatures are greater than 120° C. The suitability of a particular aliphatic polyurethane for use in the adhesion promoting layer 24 can be determined by the following simple test. A 1.0 $\mu$m thick layer of an aliphatic polyurethane containing about 10 percent by weight of a suitable cross-linking agent (such as aziridine, epoxy, carbodiimide, etc.) is coated on the substrate 20. This structure is then placed in an oven and heated at 120° C. for 20 hours. The structure is then removed from the oven and the adhesion promoting layer 24 is visually observed for signs of degradation. Degradation would be apparent if there was discoloration, cracking, bubble-formation, surface deformation, loss of adhesion to the substrate or loss of transparency. Aliphatic polyurethanes which form the adhesion promoting layer 24 and do not show any signs of degradation in this test are suitable for use in the present invention.

After curing, the adhesion promoting layer 24 the toner release layer 22 is coated thereon. The toner release layer 22 is preferably prepared by making a solvent solution including siloxanes and coating the solution onto the clean substrate 20 by conventional coating techniques, such as, ring coating, dip coating, and spray coating. The coated substrate 20 is preferably placed in a convection oven at a temperature of 150° C. to 350° C., for 10 minutes to 3 hours, preferably causing the siloxanes to undergo condensation reactions to form the silicone resin. The higher the cure temperature the shorter the cure time.

The invention will be better understood with reference to the following examples. As will be understood to those skilled in the art, during curing aliphatic polyurethanes will cross-link with each other. It is a simple matter to determine if the polyurethane is providing appropriate adhesion promotion.

Working Examples

Comparative Example A

A seamless and uncoated polyimide resin belt 823 mm (32.4 inches) in diameter and 254 mm in width (10 inches), manufactured by Gunze Co., was cleaned with anhydrous ethanol and wiped with a lint-free cloth. A mixture of 65.5 g uncured silicone polymer (Acheson RC369, which was filtered before mixing) in 25 g of naphtha VMP containing 1.5 g of DMS-C25 surfactant-plasticizer from Geleste Corp. was stirred for 30 minutes. The resulting solution was ring coated on the polyimide belt at a coating speed of 0.072 inch/second, and the coated belt was flashed at room temperature for 20 minutes. The belt was then cured by heating for 40 minutes, including a 10 minute ramp to 150° C. and 30 minutes at 150° C., to form a toner release layer.

Example 1

A seamless and uncoated polyimide belt with the same dimensions as in Comparative Example A was cleaned as before. A mixture of 132 g of Witcobond 232 (aliphatic, water dispersible polyurethane available from Witco Corp)., 10 g of Cymel 373 (melamine formaldehyde crosslinking agent available from Cytec Industries Inc.), 97 g of distilled water, and 3 g of ethoxyethyl acetate was stirred for 1 hour. The resulting solution was ring coated on the polyimide belt at a coating speed of 0.072 inch/second, and the coated belt was flashed at room temperature for 20 minutes. The polyurethane was then cured by heating for 2 hours, including a 1 hour ramp to 150° C. and 1 hour at 150° C. Onto the cured polyurethane adhesion promoting layer was coated the toner release layer described in Comparative Example A. This toner release layer was cured as before.

These two belts were then tested as described below.

Testing Conditions

In an apparatus substantially as shown in FIG. 1. but having an air knife cooling means operating at 35 psig, the belt was tested without the use of a release oil for the fusing of a black thermoplastic toner powder (Ricoh NC 5006 toner) to sheets of laser print paper at a speed of 1.5 inches per second. The fusing temperature was 250° F., the release temperature was 100° F., and the nip pressure over a distance of 0.240 inches was 35 psig at 240° F. The life tests were terminated when localized areas of the belt coating delaminated. The life test and image gloss results are summarized in Table 1. The gloss measurements were made according to ASTM-523-67 using a BYK Gardener Micro Gloss Meter set at 20 degrees.

TABLE 1

| Belt | G-20 Gloss | Belt Life # of Cycles | Comments |
|---|---|---|---|
| Comparative Example A | 90–100 | 400 | Belt failure due to delamination of silicone coating |
| Example 1 | 90–100 | 2800+ | No delamination |

The invention has been described with reference to particular embodiments, but it is appreciated that variations and modifications can be effected within the spirit and scope of the invention.

| PARTS LIST | |
|---|---|
| 10 | fuser belt system |
| 12 | heating roller |
| 13 | roller |
| 14 | fuser belt |
| 15 | pressure roller |
| 17 | receiver |
| 20 | thermally conductive substrate |
| 22 | toner release layer |
| 24 | adhesion promoting layer |

What is claimed is:

1. A toner fuser belt for use with electrophotographic apparatus comprising:

(a) a thermally conductive substrate through which heat is applied;

(b) a toner release layer formed over the substrate; and (c) an adhesion promoting layer disposed between the thermally conductive substrate and the toner release layer including an aliphatic cross-linked polyurethane which is stable at fusing temperatures provided between the substrate and the toner release layer and wherein the aliphatic cross-linked polyurethane is selected to provide adhesion between the substrate and the toner release layer which prevents delamination.

2. The toner fuser belt of claim 1 wherein the toner release layer includes a resin made by curing a composition including siloxanes having a ratio of difunctional to trifunctional units of 1:1 to 1:2.7 and at least 90% of total number of functional units of the siloxanes are difunctional and trifunctional units, a weight average molecular weight of 5,000 to 50,000, and an alkyl to aryl ratio of 1:0.1 to 1:1.2.

3. The toner fuser belt of claim 1 wherein the substrate is formed from materials selected from the group consisting of polyimide, polyesters, polyamide-imide, polycarbonates, and conductive metals.

* * * * *